United States Patent [19]
Moran et al.

[11] Patent Number: 5,327,781
[45] Date of Patent: Jul. 12, 1994

[54] METHOD AND APPARATUS FOR VERIFYING PROPER WIRING OF BRAKE PRESSURE MODULATORS

[75] Inventors: Stephen P. Moran, Avon; Charles E. Ross, Nova; Ronald E. Squires, Grafton, all of Ohio

[73] Assignee: Allied-Signal Inc., Morristown, N.J.

[21] Appl. No.: 923,030

[22] Filed: Jul. 30, 1992

[51] Int. Cl.[5] .............................................. G01L 5/28
[52] U.S. Cl. ................................................... 73/121
[58] Field of Search ........................ 73/121, 129, 132; 324/503; 364/426.01, 426.02, 426.03; 340/453; 303/92

[56] References Cited

U.S. PATENT DOCUMENTS

| | | | |
|---|---|---|---|
| 3,796,469 | 3/1974 | Birge | 324/503 |
| 4,040,676 | 8/1977 | Rajput | 340/453 |
| 4,712,841 | 12/1987 | Cage | 303/92 |
| 4,719,796 | 1/1988 | Zenker | 73/121 |
| 4,872,730 | 10/1989 | Takagi et al. | 73/121 |
| 4,912,969 | 4/1990 | Ishizeki | 73/121 |

FOREIGN PATENT DOCUMENTS 2046381 11/1980 United Kingdom ............... 73/121

OTHER PUBLICATIONS

Carley, "Don't Blame Anti-Locks For Other Brake Problems Your Shop May Encounter", Brake and Front End, May 1989, pp. 16-19.

Primary Examiner—Robert Raevis
Attorney, Agent, or Firm—Ken C. Decker; William N. Antonis

[57] ABSTRACT

A test for an electronically controlled braking system, such as an adaptive braking system, is made to assure that the solenoids of each of the modulators are properly wired. According to the test, each modulator is tested in sequence. The exhaust solenoid of a modulator is actuated for 10 milliseconds, and the hold solenoid is then actuated for 30 milliseconds. If the modulator has been miswired, the exhaust solenoid will have been actuated for 30 milliseconds, thus generating a much louder "popping" sound than that generated by the other modulators will be immediately noticed and corrected.

9 Claims, 3 Drawing Sheets

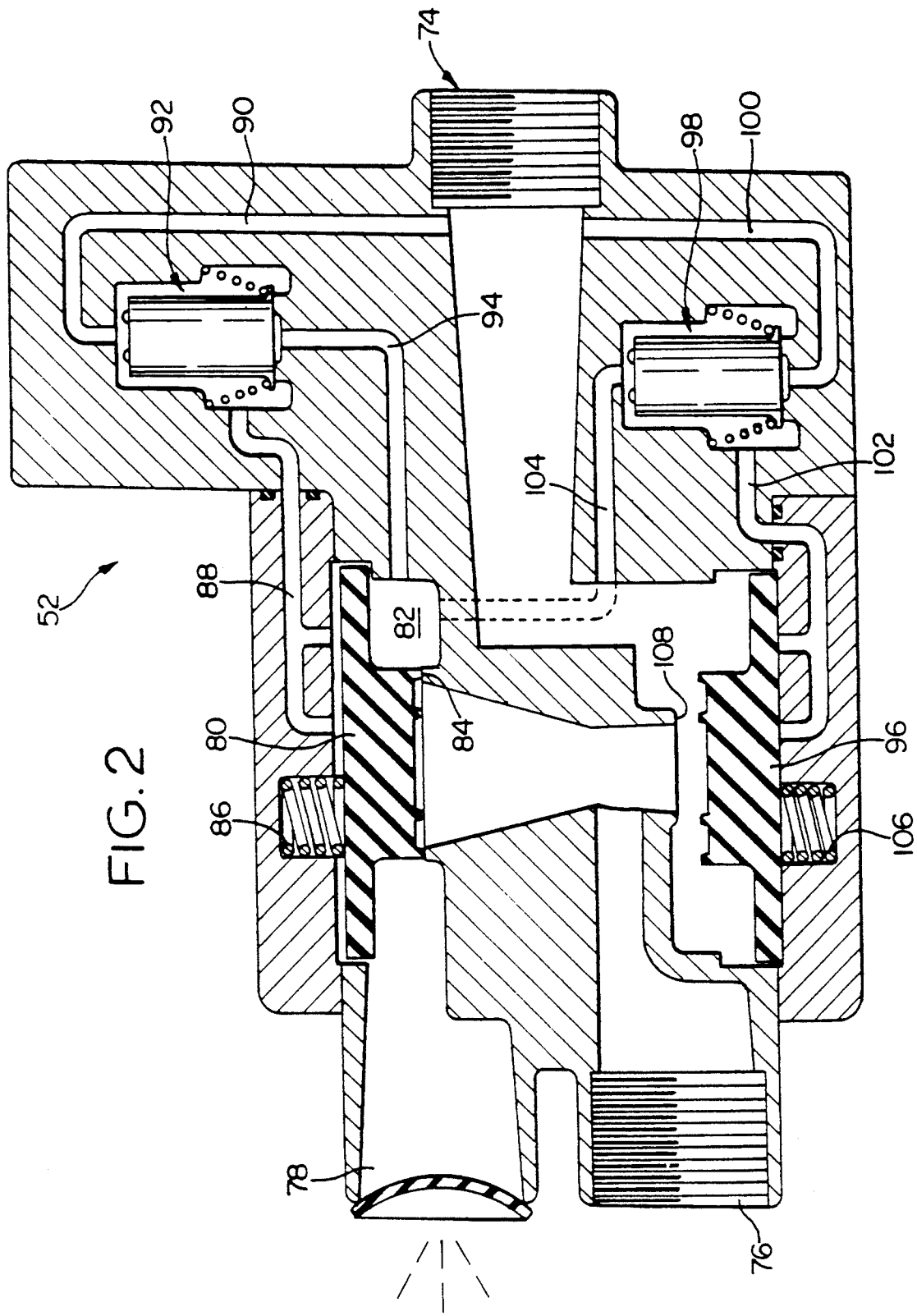

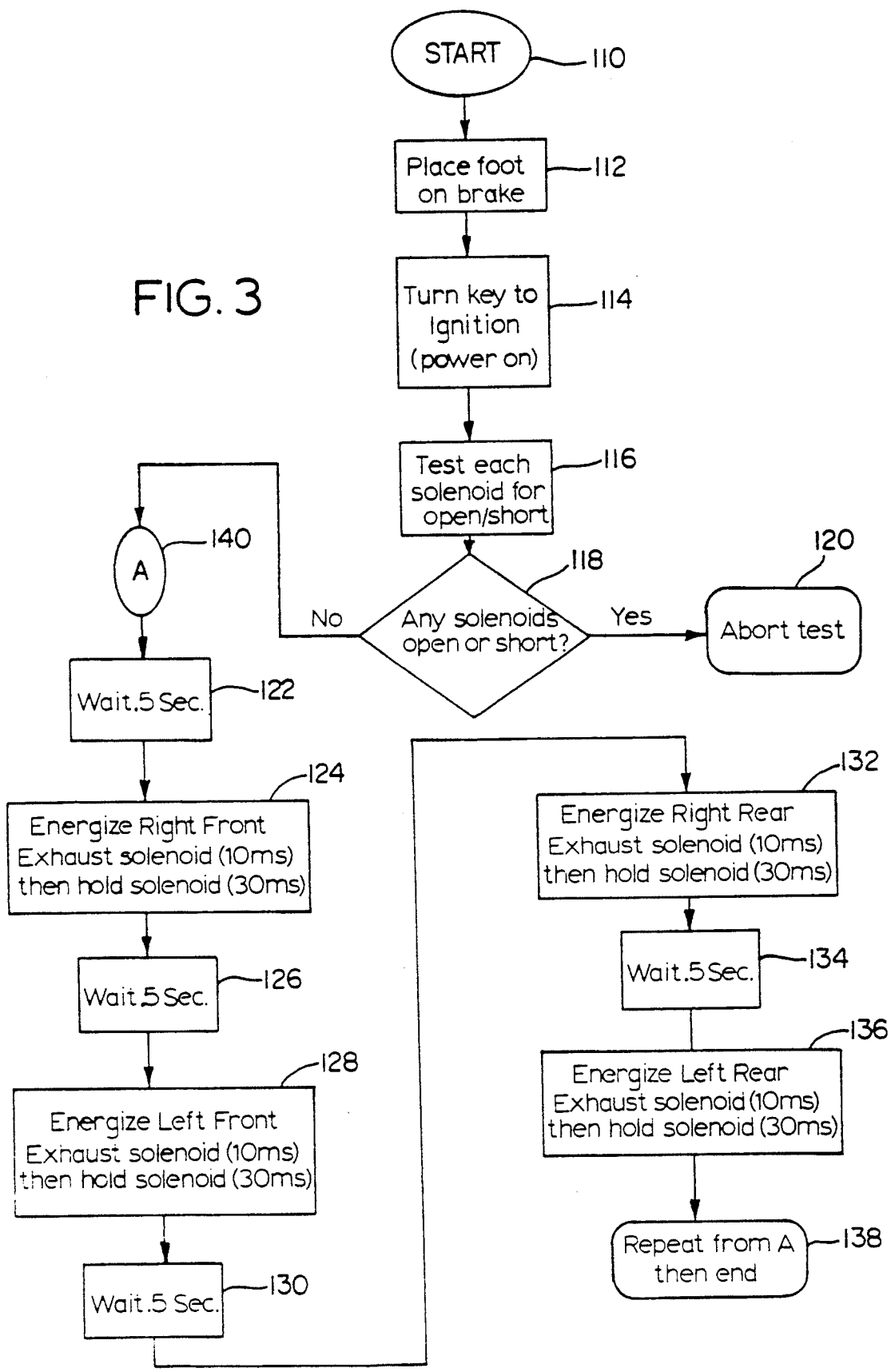

METHOD AND APPARATUS FOR VERIFYING PROPER WIRING OF BRAKE PRESSURE MODULATORS

This invention relates to an adaptive or other electronically controlled braking system for an automotive vehicle equipped with pneumatically actuated brakes.

Adaptive braking systems have become increasingly popular in recent years. Although the present invention may be used with adaptive braking systems, it is also intended for use with other electronically controlled braking systems, such as electropneumatic braking systems, whether or not such electropneumatic braking systems are also equipped with an adaptive braking subsystem.

Of course, it is necessary to assure that adaptive braking systems work properly at all times. Accordingly, it has become common to provide a series of checks upon starting the vehicle to assure that the adaptive braking or other electronically braking system is working properly. One of these checks is to make sure that all of the solenoids which operate the valves controlling communication to the vehicle brakes are neither electrically open nor shorted. If such an open or shorted condition exists, the adaptive braking system is shut down and the vehicle driver is warned.

The solenoid valves are a part of a brake pressure modulator. Each modulator includes an inlet or hold valve, which controls communication with a fluid pressure source, and an exhaust valve, which is actuatable to exhaust braking pressure to atmosphere. If the exhaust valve is actuated, the inlet or hold valve must also be actuated to keep from dumping the air supplied to the modulator from the pressure source to atmosphere.

The adaptive braking system further includes an electronic control unit, which receives inputs from speed sensors which measure wheel speeds of the wheels of the vehicle. The electronic control unit or ECU processes these wheel speed signals to determine if one or more of the vehicle wheels is about to lock up. If such an incipient lockup condition is sensed, the electronic control unit actuates the inlet or hold solenoid valve, which blocks communication between the pressure source and the brake actuator to thereby hold the pressure level then existing in the actuator, and may also dump the pressure in a brake actuator to atmosphere by simultaneously actuating both the hold and exhaust valves.

Accordingly, there are three wires connecting the electronic control unit with each modulator. One wire is a source wire that supplies power to both solenoids; the second wire provides a ground to the inlet or hold valve if a hold function is desired; and the third wire supplies a ground to the exhaust valve if an exhaust function is desired. However, if the hold and exhaust wires are swapped, the electronic control unit has no way of detecting the swapped condition since the resistance of both of the solenoids is the same. Furthermore, if the wires which should be connected, for example, to the right front modulator are instead connected to the left front modulator, the electronic control unit will measure the proper resistance for each modulator, but the electronic control unit will, in the case of an incipient lockup condition of the right front wheel, exhaust what it thinks is the right front modulator, but will actually exhaust the left front brake pressure.

The method according to the present invention provides a quick way of checking the wiring between the electronic control unit and the various modulators without requiring any tools or instruments. In the prior art, a volt-ohmmeter is necessary to individually check the wiring at each modulator while running the modulator through a test sequence. In the present invention, the exhaust and hold solenoids of each modulator are actuated serially upon engine startup. The exhaust solenoid of each modulator is actuated for 10 milliseconds, and then the hold solenoid of the same modulator is actuated for 30 milliseconds. Since the exhaust solenoid exhausts to atmosphere, the noise level generated by the valve will be a direct function of the length of time it is actuated. Accordingly, if the wiring of an individual modulator is reversed, the exhaust solenoid will be actuated for 30 milliseconds, which generates a significantly greater noise than if the exhaust solenoid is actuated for only 10 milliseconds. Since the hold or inlet solenoid controls communication between the pressure source and the actuator, no appreciable noise is generated regardless of the time period. Accordingly, the louder noise immediately appraises the mechanic or operator of a swapped wire condition. Since the solenoid valves are each actuated serially in a predetermined pattern around the vehicle, the noise generated as each solenoid is actuated will demonstrate to the mechanic or other inspector if the ECU leads have been connected to the wrong modulator, since the mechanic or other inspector will know of the proper pattern in which the modulators should be actuated.

These and other advantages of the present invention will become apparent from the following description, with reference to the accompanying drawings, in which:

FIG. 2 is a cross-sectional view of the modulating valves used in the system of FIG. 1; and FIG. 3 is a flow block diagram illustrating the manner in which the electronic control unit of the system illustrated in FIG. 1 performs the testing function of the present invention.

Figure 1:
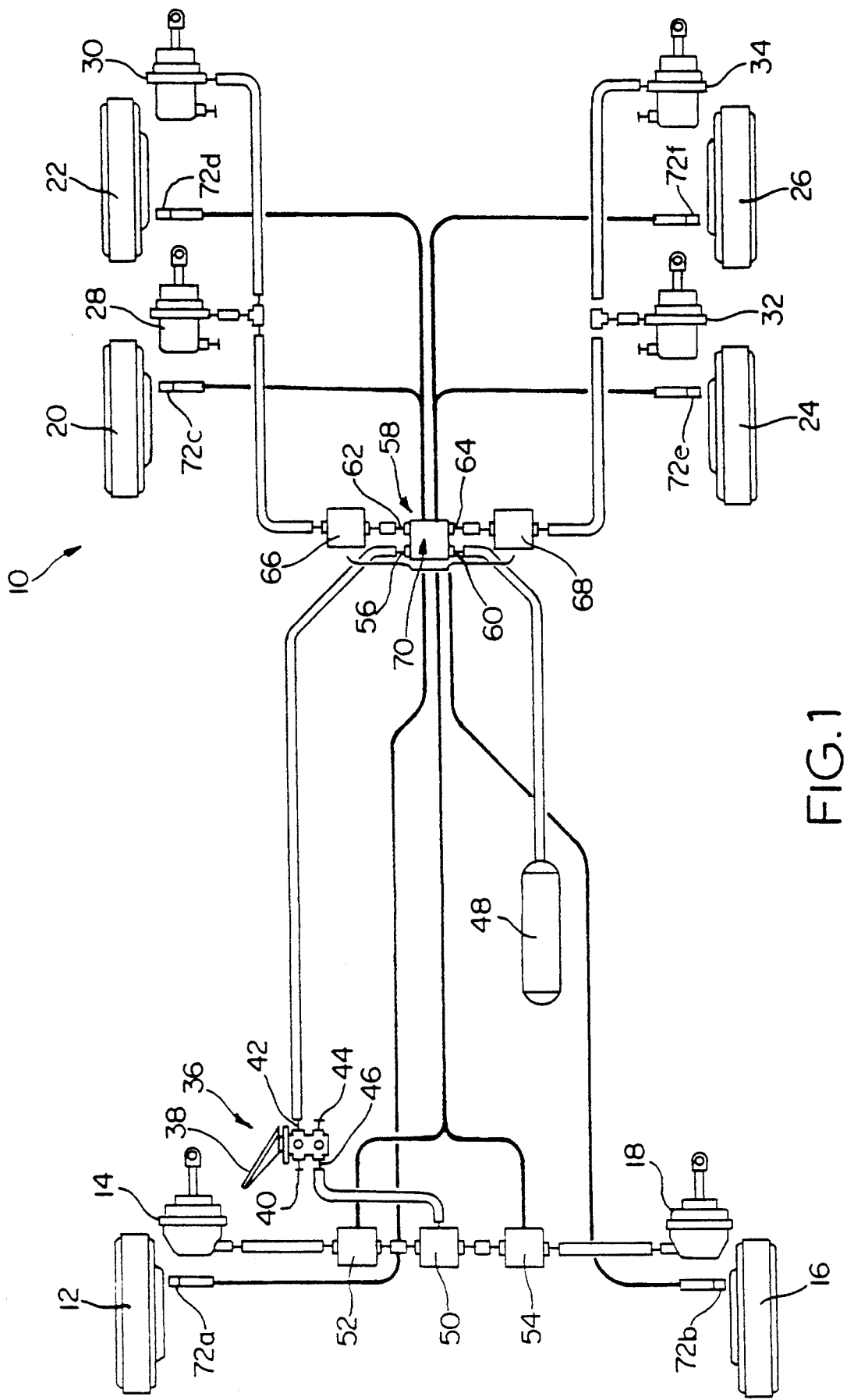
FIG. 1 is a schematic illustration of a partial air brake system for an automotive vehicle which is equipped with an adaptive braking system to control wheel lock.

Referring now to the drawings, an air brake system generally indicated by the numeral 10 includes a right front wheel 12 and brake actuator 14, left front wheel 16 and brake actuator 18, and a double axle rear bogey comprising right rear wheels 20, 22, left rear wheels 24, 26, and tandem brake actuators 28, 30, 32 and 34 for the wheels 20-26 respectively. System 10 further includes an operator actuated, dual brake valve 36 having a treadle 38 actuated by the vehicle operator. Valve 36, upon operation of the treadle 38, communicates inlet port 40 with outlet port 42 and simultaneously communicates inlet port 44 with outlet port 46 in a manner well known to those skilled in the art. The system 10 further includes a source of air pressure, such as reservoir 48, which is charged by an air compressor operated by the vehicle engine (not shown). The ports 44 are communicated with the pressure source 48, but for clarity, these communication lines have been omitted from the drawing. Outlet port 46 is communicated to the right and left wheel actuators 14, 18 through a conventional quick release valve 50 and right and left front wheel modulators 52, 54. Outlet port 42 of brake valve 36 is connected to control port 56 of a conventional relay valve generally indicated by the numeral 58. Supply port 60 of relay valve 58 is communicated to the fluid pressure source 48, and outlet ports 62, 64 of relay valve 58 are connected respectively to right rear wheel actuators 28, 30 and left rear wheel brake actuators 32, 34 through right rear wheel brake modulator 66 and left rear wheel modulator 68. The modulators 52, 54, 66 and 68 will be described in detail with reference to FIG. 2.

It has been customary to house the electronic control unit for the adaptive braking system which controls the modulators 52, 54, 66 and 68 in the cover of the relay valve 58. Accordingly, the electronic control unit is indicated generally by the numeral 70. Speed sensors 72a-f sense the wheel speed of the vehicle wheels and generate signals which are transmitted to the electronic unit 70 via the lines indicated on the drawing. Similarly, actuating signals generated by the electronic control unit 70 when an incipient skidding condition of one of the wheels is detected are transmitted to the modulators 52, 54, 66 and 68 through the aforementioned three-wire wire control leads connecting the electronic control unit 70 and the corresponding modulators as illustrated in FIG. 1.

Referring now to FIG. 2, the modulator 52 will now be described in detail. Modulator 52 is, of course, identical to the modulators 54, 66 and 68. Modulator 52 includes an inlet or supply port generally indicated by 74, an outlet or delivery pore 76, which is communicated to the corresponding brake actuator, and an exhaust port 78 which is communicated with ambient atmosphere.

An exhaust diaphragm 80 is slidable within an exhaust cavity 82 and urged into sealing engagement with exhaust seat 84 by a spring 86 and by air pressure communicating against the upper surface of the diaphragm 80 through passage 88. Passage 88 is normally connected with a passage 90 which communicates with supply port 74 when the exhaust solenoid valve indicated by the numeral 92 is in its normally open position. In the normally open position, valve 92 allows communication between the passages 88 and 90 and closes communication through passage 94, which communicates with exhaust chamber 82. Accordingly, upon energization of exhaust solenoid 92, passage 90 is sealed off and passage 88 is communicated to 94, whereupon the higher pressure air at outlet port 76 forces the exhaust diaphragm 80 off the seat 84 to permit venting of the pressure level at outlet delivery port 76 through exhaust port 78.

Similarly, a supply or hold diaphragm 96 is interposed in the communication path between the supply or inlet port 74 and the outlet or delivery port 76 and is normally open as illustrated in the drawing. Supply diaphragm 96 is controlled by a hold or supply solenoid valve generally indicated by the numeral 98 when in its normally closed position illustrated in the drawing closes off a passage 100 which communicates with supply port 74 and vents passage 102. Passage 102 communicates the control surface of the supply or hold diaphragm 96 with a passage 104 which communicates with exhaust port 78 through the exhaust chamber 82 when valve 98 is in its normally closed condition. Upon energization of the valve 98, the passage 104 is closed off and passage 100 is communicated with passage 102, thereby admitting supply air from supply or inlet port 74 to the control surface of diaphragm 96. Control pressure acting on diaphragm 96 is supplemented by spring 106, to urge diaphragm 96 into sealing engagement with valve surface 108, thereby closing off communication between the supply inlet port 74 and the outlet or delivery port 76. As discussed hereinabove, the supply or hold valve 98 would also be actuated upon actuation of the exhaust solenoid valve 92, to prevent pressure at the supply or inlet port 74 from exhausting to atmosphere through exhaust port 78.

Referring now to FIG. 3, the subroutine programmed within the electronic control unit 70 in order to perform the wiring test according to the invention is illustrated schematically. The test is started as indicated at 110 and requires that treadle 38 be depressed, as indicated at 112 while the ignition key is turned on, as indicated at 114. The test then proceeds to test each of the solenoids in each of the modulators for an open or shorted condition, as indicated at 116. This test is conventional, and is used in prior art adaptive braking system. The program then tests, as indicated at 118, the results of the test made at 116. If any of the solenoids are electrically open or shorted, the wiring test according to the present invention is aborted as indicated at 120 and a corresponding warning light is actuated.

Assuming, that there are no open or shorted solenoids, after a ½ second wait, as indicated at 122, the ECU 70 then energizes the right front exhaust solenoid for 10 milliseconds and thereafter (after the 10 millisecond time period has expired) actuates the right front hold solenoid for 30 milliseconds as indicated at 124. After this is done, the program waits ½ second, as indicated at 126, and then energizes the left front exhaust solenoid for 10 milliseconds, followed by an energization of the hold solenoid for 30 milliseconds, as indicated at 128. After still another ½ second wait, as indicated at 130, the exhaust solenoid of the right rear modulator 66 is actuated for 10 milliseconds, and thereafter the hold solenoid is actuated for 30 milliseconds, as indicated at 132. After this time period has expired, the program waits for half a second, as indicated at 134, and then energizes the exhaust solenoid of the left rear modulator 68 for 10 milliseconds and then the hold solenoid of the left rear modulator 68 for 30 milliseconds, as indicated at 136. As indicated at 138, the program then branches back to A, indicated at 140 and then repeats the test. The program then ends.

Since the delivery or hold solenoid 98 controls communication into a closed volume, an observer or mechanic standing outside of the vehicle upon which the system 10 is used will only hear a brief clicking sound when the solenoid 98 is actuated. Since the exhaust solenoid 92 exhausts pressure through the exhaust port 78, and observer or mechanic standing outside the vehicle will hear a "popping" sound when the solenoid valve 92 is actuated during the test. However, the "popping" sound will be progressively louder as the solenoid valve 92 is actuated for a longer period of time. Accordingly, when the solenoid valve 92 is actuated for 10 milliseconds, a relatively soft popping noise will be heard, but if the solenoid valve 92 is actuated for 30 milliseconds, a significantly louder "popping" sound will be heard. Accordingly, during the test, a mechanic or observer on the outside of the vehicle listens for the actuating noises of the modulators in the predetermined pattern (right front, left front, then right rear and left rear) established by the test. If the noises occur in the proper order, the mechanic or observer knows that, for example, the leads for the right front modulator have not been connected to the left front modulator.

If the wires connected to an individual modulator have been reversed, the hold solenoid will be actuated for 10 milliseconds, and the exhaust solenoid will be actuated for 30 milliseconds. No appreciable difference in sound will be made by actuating the hold solenoid for the shorter time; however, since the exhaust solenoid has been turned on for 30 milliseconds instead of 10 milliseconds, a much louder than normal "popping" will be generated. The observer or mechanic will immediately recognize this louder noise, particularly if all the other solenoids are indeed properly wired. Accordingly, it will be recognized that an improperly wired modulator is present, and the fault can then be manually corrected.

We claim:

1. Method of testing an electronically controlled braking system to assure that exhaust and hold solenoids valves are properly wired, said electronically controlled braking system having an electronic control unit and at least one modulator controlled by said electronic control unit for controlling the braking pressure of at least one of the wheels of the vehicle, said modulator having a hold solenoid valve for controlling communication between said modulator and a pressure source and an exhaust solenoid valve for controlling communication between said modulator and ambient atmosphere, comprising the steps of energizing one of the solenoid valves for a predetermined time period, and energizing the other solenoid valve of said modulator for a predecided time period significantly different from said predetermined time period to permit pressure to exhaust through the exhaust solenoid valve for one of said time periods if the exhaust and hold solenoid valves are properly wired and for the other of said time periods if said exhaust and hold solenoid valves are improperly wired, whereby the noise generated by pressure exhausting through said exhaust solenoid valve for the other time period is significantly different from the noise generated by pressure exhausting through said exhaust solenoid valve for said one time period, thereby alerting of a miswired solenoid valve condition.

2. Method of testing an electronically controlled braking system as claimed in claim 1, wherein said one time period is substantially shorter than said other time period.

3. Method of testing an electronically controlled braking system as claimed in claim 2, wherein the steps of energizing the hold and exhaust solenoids for said time periods are repeated serially for each modulator controlling one or more brakes of the vehicle.

4. Method of testing an electronically controlled braking system as claimed in claim 3, wherein said method includes the step of waiting a preestablished time period after the solenoid valves of each modulator are actuated before actuating the valves of another modulator.

5. Method of testing an electronically controlled braking system as claimed in claim 4, wherein said method steps are initiated by starting the vehicle while effecting a brake application.

6. Method of testing an electronically controlled braking system as claimed in claim 2, wherein said one time period is the predetermined time period and the other time period is the predecided time period.

7. Method of testing an electronically controlled braking system as claimed in claim 1, wherein said electronically controlled braking system includes testing means for checking said solenoids to determine if any of said solenoids are open or short, said method including the steps of checking all of the solenoids for open solenoid or a shorted solenoid condition before actuating said solenoids for the predetermined or predecided time periods.

8. Electronically controlled braking system comprising an electronic control unit and at least one modulator controlled by said electronic control unit for controlling the braking pressure of at least one of the wheels of the vehicle, said modulator having a hold solenoid valve for controlling communication between said modulator and a pressure source and an exhaust solenoid valve for controlling communication between said modulator and ambient atmosphere, said electronic control unit including testing means for permitting determination of improperly wired solenoid valves, said testing means including means for energizing one of the solenoid valves for a predetermined time period and for energizing the other solenoid valve of said modulator for a predecided time period significantly different from said predetermined time period after said predetermined time period has expired, whereby the noise generated by pressure exhausting through said exhaust solenoid valve for one of said time periods is significantly different from the noise generated by pressure exhausting through said exhaust solenoid valve for the other time period, thereby alerting of a miswired solenoid valve condition.

9. Electronically controlled braking system as claimed in claim 8, wherein said one time period is substantially shorter than said other time period.

* * * * *